US011513048B2

(12) United States Patent
Jobert

(10) Patent No.: US 11,513,048 B2
(45) Date of Patent: Nov. 29, 2022

(54) OPTICAL PARTICLE DETECTOR

(71) Applicant: COMMISSARIAT A L'ENERGIE ATOMIQUE ET AUX ENERGIES ALTERNATIVES, Paris (FR)

(72) Inventor: Gabriel Jobert, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 16/511,102

(22) Filed: Jul. 15, 2019

(65) Prior Publication Data
US 2020/0033246 A1 Jan. 30, 2020

(30) Foreign Application Priority Data

Jul. 16, 2018 (FR) .................... 18 56536

(51) Int. Cl.
G01N 15/06 (2006.01)
G01N 15/14 (2006.01)

(52) U.S. Cl.
CPC .......... *G01N 15/06* (2013.01); *G01N 15/1434* (2013.01); *G01N 2015/0693* (2013.01)

(58) Field of Classification Search
CPC ........... G01N 15/06; G01N 2015/0693; G01N 15/0211; G01N 15/1436; G01N 15/1459; G01N 15/1484; G01N 1/2273; G01N 2015/0046; G01N 2015/035; G01N 15/1434; G05F 1/468; G05F 1/56;
(Continued)

(56) References Cited

U.S. PATENT DOCUMENTS 5,719,667 A 2/1998 Miers
6,198,110 B1* 3/2001 Kaye ................. G01N 15/1436
250/573
(Continued)

FOREIGN PATENT DOCUMENTS

EP 1 987 389 A2 11/2008
FR 2 963 101 A1 1/2012
(Continued)

OTHER PUBLICATIONS

French Preliminary Search Report dated Apr. 18, 2019 in French Application 18 56536 filed on Jul. 16, 2018 (with English Translation of Categories of Cited Documents).
(Continued)

*Primary Examiner* — Tri T Ton
(74) *Attorney, Agent, or Firm* — Oblon, McClelland, Maier & Neustadt, L.L.P.

(57) ABSTRACT

A particle detector including at least one channel intended to receive at least one fluid comprising particles and configured to receive at least one light beam emitted by a light source. The particle detector further including at least one photodetector network configured such that at least some photodetectors receive light beams emitted by the source and scattered by the particles present in the channel. The detector further comprises at least one optical system, each optical system s associated with a photodetector network and has at least one image focal plane and an optical axis. The detector is configured such that the image focal plane of the optical system is optically coupled to the photodetector network.

20 Claims, 7 Drawing Sheets

(58) Field of Classification Search
CPC .... H02M 3/156; H03F 1/0211; H03F 1/0261; H03F 1/342; H03F 2203/45244; H03F 2203/45506; H03F 2203/45702; H03F 3/45183
USPC .................................................. 356/335–343
See application file for complete search history.

(56) References Cited

U.S. PATENT DOCUMENTS

| | | |
|---|---|---|
| 2003/0048539 A1* | 3/2003 | Oostman, Jr. ......... G01J 3/0205 359/634 |
| 2011/0223586 A1 | 9/2011 | Karabinus |
| 2013/0120749 A1 | 5/2013 | Nicoletti |
| 2014/0226158 A1* | 8/2014 | Trainer ................... G01J 3/453 356/336 |
| 2016/0077218 A1 | 3/2016 | Loi et al. |
| 2019/0072676 A1 | 3/2019 | Loi et al. |

FOREIGN PATENT DOCUMENTS

| | | |
|---|---|---|
| FR | 3 062 209 A1 | 7/2018 |
| WO | WO 2007/100723 A3 | 9/2007 |
| WO | WO 2018/138223 A1 | 8/2018 |

OTHER PUBLICATIONS

Craig F. Bohren, et al. "Absorption and scattering of light by small particles" Ed. Wiley and Sons, 1983 (Abstract Only), 1 page.

* cited by examiner

OPTICAL PARTICLE DETECTOR

TECHNICAL FIELD OF THE INVENTION

The present invention relates to the field of optically detecting particles, generally and more specifically of a micrometric, even nanometric size. It will have a particularly advantageous, but non-limiting, application in controlling the quality of air, detecting microbiological species, detecting explosive powder, as well as alarm system such as those identifying smoke particles for detecting fires.

STATE OF THE ART

Detectors of particles are generally based on analysing the scattering of light by particles. These detectors thus generally comprise optical sensors configured to measure the scattering of light by particles.

Detectors comprise a light source which illuminates a channel through which the particles to be detected pass.

If particles are present in the illuminated zone, these will both absorb light which comes from the source and will deviate this light outside of the main propagation direction according to the scattering phenomenon. The angular scattering effectiveness is characteristic of the shape, of the size, of the optical index and of the concentration of particles. The recording of this angular scattering effectiveness therefore makes it possible to analyse these different particle parameters.

Concerning the optical detection of particles, there are two main detection methods.

The first method is a measurement called obscuration, i.e. the measurement of absorbing light through a particle cloud or an accumulation of particles. This measurement makes it possible to determine the concentration of particles using Beer-Lambert law if the particle cloud composition is known in advance.

The second method is a measurement of scattered light outside of the optical axis. This measurement makes it possible to determine the concentration of particles according to light scattering theories, for example, Mie scattering (Ref: Bohren and Huffmann, Absorption and scattering of light by small particles, Ed. Wiley and Sons, 1983). To analyse the nature of the particles of the cloud, for example an angular measurement of the scattering can be proceeded with, for example using a goniometer constituted of a photodetector mounted on a rotating arm, or using a discreet photodetector assembly.

This type of detector has the disadvantages of being very complex, very expensive and not very robust. Thus, it cannot be transported easily. Moreover, it cannot be considered to equip alarm or measuring systems for a low cost. Yet, for example, for the field of detecting fires in dwellings or for the field of controlling the quality of air, it is essential to propose solutions, of which the costs are low and of which the robustness is increased.

Other optical detection methods have also been proposed.

For example, optical particle counters function on the two principles mentioned above, to the feature, except that the particle/light interaction zone is geometrically limited by the focalisation of a laser source and/or by a microfluidic channel. This geometric limitation of the active zone makes it possible to detect single particles rather than clouds.

Other optical methods consist of observing particles by processing images obtained by microscopy or by holographic reconstruction.

These methods also have a relatively low robustness and an increased cost.

In order to improve the robustness of particle detectors and to reduce the cost thereof, solutions have been proposed to integrate optical detectors in chips using microelectronic and photonic technologies.

Document FR2963101 describes such a solution. This solution provides a light source conveyed by a waveguide which illuminates an channel etched in a silicon substrate and through which particles will circulate. The diffraction of incident light by these particles is detected by two peripheral photodetectors produced on the silicon substrate.

This solution makes it possible to reduce the volume of the sensor. However, it is extremely difficult with this type of solution to obtain sufficiently precise and complete information about the particles.

It is particularly difficult, even impossible, to analyse or determine the nature of the particles.

Document US2016/0077218 A1 also describes a detector formed on a chip and comprising a photodetector matrix used to produce a direct image of the beam scattered by the particles. With this solution also, it is difficult to analyse or determine specifically the nature of the particles.

Also, there are other methods, this time non-optical, to detect particles.

Among these non-optical detection methods, the gravimetric measurement consists of measuring the mass of an accumulation of particles. A variant consists of measuring the mass of one single particle using an oscillating balance.

Another non-optical method, detecting particles by ionisation, consists of measuring the variation of the current induced by an ionised air chamber when there are particles present. Moreover, measuring by beta attenuation consists of measuring the attenuation of a beta radioactive source through a particle cloud using a Geiger counter.

The non-optical methods proposed to date however have levels of complexity even greater than the optical detection methods.

There is therefore a need consisting of proposing a solution to improve the precision of information relating to the particles, for example in order to determine the nature thereof, while having a level of complexity or a limited cost and a satisfactory response time.

Such is the aim of the present invention.

SUMMARY OF THE INVENTION

The present invention relates to a particle detector comprising at least:
  one channel intended to receive at least one fluid comprising particles and configured to receive at least one incident light beam emitted by a light source; and
  one photodetector network configured such that at least some of the photodetectors receive light beams coming from the source and scattered by the particles present in the channel.

The detector further comprises at least one optical system intended to be passed through by at least some of the light beams after the scattering thereof by the particles and before the receiving thereof by the photodetectors.

Each optical system is associated with a photodetector network and has at least one image focal plane.

The detector is configured such that, preferably for each optical system, said image focal plane is optically coupled to the photodetector network such that all the beams scattered by the particles along parallel directions before passing through the optical system, reach, after passing through the optical system, one same point of the photodetector network associated with this optical system.

Moreover, according to an optional and non-limiting embodiment, the at least one optical system is convergent, so as to make the light beams coming from the source converge, and not scattered by the particles towards an image focus located on the image focal plane of the optical system.

Thus, the at least one optical system is convergent, so as to make the light beams passing through it converge over the photodetector network associated with this optical system.

The optical system is not, however, configured so as to collimate the beams.

The association of the channel, of the at least one photodetector network and of the at least one optical system makes it possible to significantly improve the precision of detecting and analysing particles present in the channel, while offering a rapid response time.

Indeed, the claimed detector makes it possible to not dazzle the photodetectors with the cluster from the source or dazzle a reduced zone of the photodetectors. Often, the cluster produced by the source, particularly when it is collimated upon the arrival thereof on the particle, has an optical power of several magnitudes greater than the power of the beams scattered by the particles. The photodetectors receiving the cluster from the source do not therefore make it possible to identify the beams scattered. Reducing the blinding zone thus makes it possible to measure the scattering of particles for low deviation angles, i.e. for beams scattered very close to the cluster. The invention thus makes it possible to provide richer information relating to the scattering of particles. The invention therefore makes it possible to improve the precision of detection and analysis.

Moreover, the detector according to the invention possibly has a large channel, typically a very wide channel (maximum dimension measured in a plane perpendicular to the main extension axis thereof). This makes it possible to facilitate the movement of the fluid and therefore the particles inside the channel, by natural convection and even in the absence of any pump, which is essential for rapidly detecting and/or analysing the particles.

However, according to the claimed detector, this significant channel dimension does not create an out-of-focus position of particles or creates a very limited blurriness.

Indeed, with a conventional detector not having any optical system such as that of the detector according to the invention, if a cloud contains particles located at random positions and that these particles project scatter diagrams translated along the relative positions thereof and if the distances which separate the photodetectors are of the same magnitude as the distances which separate the particles from the cloud, thus an out-of-focus position is expected. This out-of-focus position is as significant as the width of the channel is large. This out-of-focus position leads to a decrease of the sensitivity of the sensor as well as a loss of contrast of information shown by the particle beam diagram.

FIG. 2 very schematically illustrates a solution to the problem of the out-of-focus position and to the blinding zone. In the example illustrated in this FIG. 2, the imager, i.e. the photodetector 231 network 230 coincides with the image focal plane 151 of the optical system 15.

This figure will be described in more detail in the following detailed description. However, it appears immediately in this FIG. 2, that according to the optical system 15, all the beams scattered 12a, 12a' by the particles 60, 60' along parallel directions reach one same point of the photodetector 231 network 230. In this example, the photodetector 231a therefore receives all the light beams 12a, 12a' scattered by the particles 60, 60' along parallel directions.

Moreover, the claimed detector makes it possible that the zone of the photodetector 231 network 230 which is impacted by the main cluster, i.e. the blinding zone 118, is specific on the image focal plane 151 (if the cluster from the source is collimated) or all the more, has a very reduced surface (in particular, if the cluster from the source is not collimated). This zone corresponds to the image focus located on the image focal plane 151. Thus, not very many photodetectors 231e are blinded. Moreover, light beams 12c', 12d' scattered with very low angles around the main propagation direction 105 of the incident light beam received by the channel 20 will be detected. Indeed, the photodetectors 231c, 231d, which receive these light beams 12c', 12d', are not blinded.

Thus, with the claimed detector, all the light beams scattered which are oriented along the same direction fall onto one same point of the imager. The scattered light beams which are oriented along two different angles, by reaching the optical system, fall onto two separate points of the imager. All the scattered light beams which are oriented by forming one same angle (i.e. same scattering angle) by reaching the direction optical system fall onto the image by being distributed over one same circle. These beams scattered by one same particle along non-parallel directions, but according to one same scattering angle thus reach one same circle of the imager.

Thus, the beams scattered by one same particle reach photodetectors according to circles or concentric circular arcs according to the respective diffraction angles thereof.

Thus, the image obtained is an angular image of scattering a particle cloud, and this image is independent from the individual position of each particle. It can thus be considered that the image obtained is a spatial Fourier transform of the beam of the cloud.

Consequently, with respect to the solutions as those described in the prior art FR2963101 or US2016/0077218 A1 mentioned above, the invention proposes a particularly effective solution for improving the precision or the sensitivity of information relating to the particles, for example, in order to determine the nature thereof, while having a limited level of complexity, a limited cost and a satisfactory response time.

It will be noted, that according to an embodiment of the invention, each optical system is not necessarily convergent. Thus, no optical system can be had, which is configured so as to make the light beams passing through it converge. In this case, the detector does not have the advantages mentioned above relating to reducing the blinding zone.

The present invention also relates to a system comprising a detector according to any one of the preceding claims, wherein the system is taken from among:
  a fire alarm system,
  a fire detection system,
  a system for analysing the quality of a fluid such as air or water,
  a pollution alarm system,
  a system for detecting explosive powder, and
  a system for detecting microbiological species.

The present invention also relates to a method for producing a particle detector, comprising at least the following steps:
  Providing at least one optical circuit comprising at least one optical system, preferably a plurality of optical systems, Providing at least one optronic circuit comprising at least one substrate carrying at least one photodetector network and preferably a plurality of photodetector networks, and Superimposing the optical circuit and the optronic circuit such that said image focal plane of the optical system is optically coupled to the photodetector network such that all the beams scattered by the particles along parallel directions before passing through the optical system, reach, after passing through the optical system, one same point of the photodetector network associated with this optical system.

This method has the advantage, among others, of being easily reproducible and of making it possible to obtain a specific detector at a limited cost.

According to an embodiment, to one point of the image focal plane of each optical system, corresponds one single point of the photodetector network associated with this optical system.

According to an optional embodiment, the optical circuit also further comprises a passage and the optronic circuit further comprises an opening, and wherein the step of superimposing the optical circuit and the optronic circuit is carried out so as to arrange opposite the passage and the opening to partially define at least the channel.

BRIEF DESCRIPTION OF THE FIGURES

The aims, objectives, as well as the features and advantages of the invention will best emerge from the detailed description of embodiments of the latter, which are illustrated by the following appended drawings, wherein:

FIG. 8b illustrates, very schematically, an optical system alternative to that represented in FIG. 8a.

Figure 1:
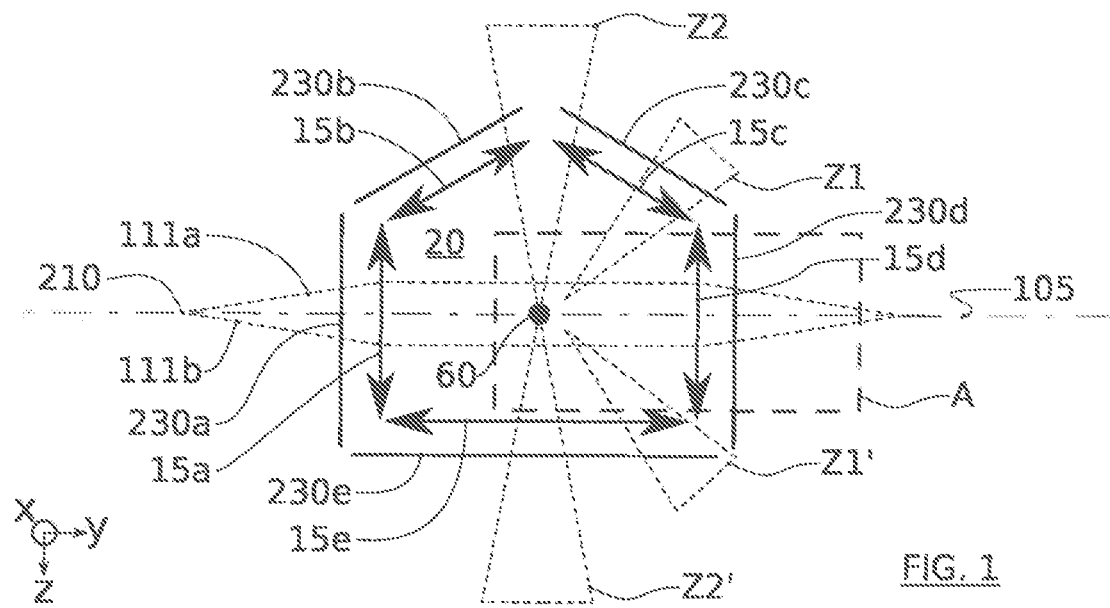
FIG. 1 is a diagram illustrating the asymmetric structure of the optical systems with respect to the main propagation direction. In this non-limiting example, the detector comprises five optical systems.

The appended drawings are given as examples and are not limiting of the invention. These drawings are schematic representations and are not necessarily to the scale of the practical application. In particular, the relative dimensions of different layers, optical systems, reflective surfaces, channel, photodetectors and other structures are not representative of reality.

DETAILED DESCRIPTION OF THE INVENTION

It is specified that in the scope of the present invention, the term "on", "surmounts", "covers" or "underlying" or the equivalents thereof do not mean "in contact with". Thus, for example, the deposition of a first layer on a second layer, does not compulsorily mean that the two layers are directly in contact with one another, but this means that the first layer covers at least partially the second layer by either being directly in contact with it, or by being separated from it by at least one other layer or at least one other element.

Except for any specific indication on the contrary, technical features described in detail for a given embodiment can be combined with the technical features described in the context of other embodiments described as a non-limiting example.

In the scope of the present invention, the term "particle", or the equivalents thereof, defines a component of a physical system considered as elementary with respect to the properties studied. For example, a particle is a material element of which the greatest dimension is less than a few millimetres ($10^{-3}$ metres), preferably less than one millimetre, and preferably less than a few tens of micrometres ($10^{-6}$ metres) and preferably less than one micrometre, even in the nanometre range ($10^{-9}$ m). More generally, the particles have a size 40 Å ($10^{-9}$ m) and are therefore considered as optically continuous. Generally, these are objects composed of material of which the dimensions are small with respect to the dimensions of the particle circulation channel.

Below, the term "diffraction", "scattering" or the equivalents thereof refer to the phenomenon by which a propagation environment produces a distribution, in numerous directions, of the energy of an electromagnetic wave, light for example.

In the present description, a material is considered as transparent as soon as it lets at least 50% of a light beam pass through it, preferably at least 75% and advantageously at least 90%.

Below, the term "reflection" or the equivalents thereof refers to the phenomenon of reemission from an element or a surface of an incident light beam. In the present description, an element is considered as reflective as soon as it reemits at least one portion of an incident light beam, this portion being greater than or equal to 50%. A reflectiveness coefficient varies from 0% for a non-reflective element to 100% for an element fully reflecting an incident light beam.

Before starting a detailed review of embodiments of the invention, below, optional features are stated, which can possibly be used in association or alternatively:

According to an example, the at least one optical system has an optical axis and at least one optical system is convergent so as to make the light beams converge in the direction of the optical axis, before they arrive on the photodetector network.

According to an example, the detector is configured such that, preferably for each optical system, said image focal plane is optically coupled to the photodetector network, such that beams scattered by the particles along different directions before reaching and therefore before passing through the optical system reach, after passing through the optical system, separate points of the photodetector network associated with this optical system. Thus, if the size of the photodetectors is sufficiently small, the beams scattered by the particles along different directions before reaching the optical system reach, after passing through the optical system, separate photodetectors of the photodetector network. The detector is thus capable of identifying and differentiating beams scattered according to different scattering angles.

The detector is configured such that said image focal plane of the optical system is optically coupled to the photodetector network, such that all the beams scattered by a particle along non-parallel directions and according to one same scattering angle, before reaching the optical system, and therefore before passing through the optical system reach, after passing through the optical system, separate points of the photodetector network associated with this optical system, these points being located on one same circle.

A complete scatter diagram can thus be reconstituted. For example, a value representative of the intensity scattered for each scattering angle can be obtained. This makes it possible to provide a very precise analysis of the particles.

According to an example, the optical system is convergent so as to make the light beams coming from the source converge towards at least one image focus located on the image focal plane of the optical system. More specifically, the optical system is convergent, such that the light beams coming from the source and which have not been deviated by the particles converge towards an image focus, called main image focus and located on the image focal plane;

and such that the beams scattered by the particles themselves converge towards other image focuses, called secondary image focuses, which are located on the image focal plane.

According to an embodiment example, each optical system is associated with a photodetector network and has one single image focal plane.

According to an embodiment example, each optical system is convergent, so as to make the light beams passing through each optical system converge. Thus, both the blurriness and blinding zone are considerably reduced.

The detector does not comprise any optical element between the optical system and the particles. In other words, all the elements modifying the scattered beams, in particular the direction thereof, belong to the optical system.

According to an example, said image focal plane of the optical system is optically coupled to the photodetector network such that each point of the image focal plane of the optical system optically corresponds, according to a bijective function, to a point of the photodetector network associated with this optical system.

There is a bijective correspondence between each point of the image focal plane of the at least one optical system and each point of the photodetector network.

According to an example, the image focal plane of the optical system is combined with the photodetectors of the photodetector network associated with this optical system.

Thus, in this embodiment, the imager is placed at the image focal plane of the optics, typically a converging lens of the optics. Therefore, this is the most direct coupling. This makes it possible to make the method for producing and reducing the volume of the detector more reliable.

According to an example, the image focal plane of the optical system is located at a distance (i.e. at a non-zero distance) from the photodetectors of the photodetector network associated with this optical system.

For example, an intermediate element, such as a transparent layer, is arranged between the system, the image focal plane and the photodetectors. In this embodiment, the intermediate layer and the optics are configured such that there is a bijective correspondence between each point of the network and each point of the image focal plane. According to an embodiment, it is provided that this intermediate layer brings about no deviation of the light beams.

Other coupling types can be provided between the image focal plane and the photodetector network. For example, it can be provided that the intermediate layer brings about or on the contrary, a divergence of the light beams.

According to an example, the detector comprises a plurality of optical systems, each optical system being associated with a photodetector network, the plurality of optical systems being arranged so as to extend around at least one portion of the channel.

This makes it possible to collect, at the level of the photodetector network, light beams scattered according to a greater scattering angle, in particular if the optical systems are arranged continuously, or according to several discreet scattering angles if the optical systems are not arranged continuously. The invention thus makes it possible to increase the diffraction diagram to which access is had. Thus, more information about the particles is thus then collected. The precisions of analysing and identifying the nature of the particles are thus improved.

According to an embodiment example, each optical system of the plurality of optical systems is associated with a photodetector network and has one single image focal plane.

According to an example, the plurality of optical systems is arranged so as to extend around the whole channel. Thus, the optical systems extend all around the channel. This thus makes it possible to increase the diffraction diagram to which access is had. The precisions of analysing and identifying the nature of the particles are also improved in this.

According to an example, the plurality of optical systems is arranged continuously around the whole channel. This makes it possible to collect the scatter diagram over 180° even 360°. The invention thus makes it possible to collect information in a greater quantity. Detecting particles and identifying the parameters thereof, such as the sizes thereof, the optical diffraction index thereof or the nature thereof, is therefore improved.

According to an example, the photodetector network associated with the optical systems form a photodetector matrix. This matrix can be rectangular or not. Thus, according to this example, there is no discontinuity between the different networks associated with the different optical systems.

According to an example, each optical system has at least one image focal plane and an optical axis. The detector is configured such that all the beams scattered by the particles along parallel directions before passing through the optical system reach one same point located on the image focal plane. The detector is configured such that all the beams scattered by the particles according to one same angle, with respect to the optical axis for example, before reaching and therefore passing through the optical system reach one same circle located on the image focal plane. As the detector is configured such that each point of the image focal plane corresponds bijectively to a point of the photodetector network, all these beams scattered along parallel directions reach the network by forming a circle or a point.

According to an example, the photodetectors of the photodetector network are arranged along isovalue curves of the scattering angles.

According to an example, the number N of optical systems is odd, preferably with N=3, 5 or 7.

According to an example, the detector is configured such that the figure of scattering particles has an axis of symmetry which coincides with a main propagation direction of the incident light beam propagating in the channel. Preferably, the optical systems of the plurality of optical systems are distributed non-symmetrically with respect to said main direction of propagation.

A difficulty induced by a conventional assembly of several optical systems is that the ends of the lenses of these optical systems have aberrations. Moreover, the zones at the line between two lenses risk not being correctly imaged.

By providing an asymmetrical assembly of lenses with respect to the main propagation direction, non-imaged angles can be found which are in the vicinity of the line of two lenses, as the scattering information is also supported by the symmetrical angles (with respect to the main propagation direction) which themselves are not found at the line of two lenses.

FIG. 1 will be described in detail in the sections relating to the detailed description. However, it appears immediately in this FIG. 1, that the zones Z1' and Z2, located at the line between two adjacent lenses will not be imaged or will be incorrectly imaged. However, the information supported by the light beams reaching into these zones can be found in the zones Z1 and Z2', symmetrical from the zones Z1' and Z2 with respect to the main propagation direction. Yet, according to the asymmetrical assembly of the optical systems, these zones Z1' and Z2 are not located at the line between two optical systems and will be perfectly imaged.

This therefore makes it possible to reconstruct the angular image perfectly precisely.

According to an example, the detector comprises an optical circuit, the optical circuit comprising the plurality of optical systems. According to an example, the detector comprises an optical circuit forming a one-piece assembly. This means, for example, that the optical circuit is formed of one single holding. It can be handled fully by being held by one of these portions. The handling of one of the optical systems of the optical circuit leads to the handling of the plurality of the optical systems. This one-piece assembly is separate from the optronic circuit.

According to an embodiment example, the optical circuit furthermore has a passage partially forming at least the channel.

According to another example, the detector comprises an optical circuit not forming a one-piece assembly.

According to an example, the detector also comprises an optronic circuit comprising a substrate supporting at least one from among the photodetector network and said source, the optronic circuit having an opening opposite the passage.

The optical circuit forms a one-piece assembly. Preferably, before assembling the optical and optronic circuits, the optronic circuit forms a one-piece assembly, separate from the optical circuit.

According to an example, the optical circuit and the optronic circuit are superimposed and preferably in contact. This specific example is applied to the case where the optical circuit does not form a one-piece assembly and to the case where the optical circuit forms a one-piece assembly. This specific example makes it possible to provide a very complete scatter diagram of the particles. It thus makes it possible to considerably improve the precision of the information collected about the particles. Moreover, this embodiment has the advantage of considerably reducing the volume of the system. In particular, the surface occupied by the optronic circuit is reduced. Likewise, the surface occupied by the optical circuit is reduced.

The optical circuit extends between two parallel planes P1, P2. The optronic circuit extends between two parallel planes P3, P4. P1, P2, P3 and P4 are parallel.

The interface formed between the optical circuit and the optronic circuit is a plane parallel to P1, P2, P3 and P4. If the optical circuit and the optronic circuit are in contact, this interface corresponds to P2 and P3.

According to an example, the photodetector networks extend, preferably all of them, in one same plane and the optical systems comprise reflective optics configured to reflect the beams scattered by the particles in the direction of said plane.

According to an example, the detector further comprises said at least one source configured to emit said at least one incident light beam and one substrate. At least one from among the photodetector network and the source is supported by the substrate.

According to an example, the detector comprises several optical systems and the focal planes of the optical systems are coplanar. This makes it possible, in particular, to simplify the production of the circuit supporting the imagers.

According to an example, the detector further comprises said at least one source configured to emit said at least one light beam and one substrate, and the at least one photodetector network and the source are supported by the substrate, preferably by a front face of the substrate.

According to an example, the channel extends along a main extension direction. The at least one photodetector network extends mainly into a plane (yz) perpendicular to said main extension direction (x) of the channel. The detector comprises said source, said source emitting a light beam along a main emission direction parallel to said main extension direction (x) of the channel and perpendicular to said plane (yz) wherein the at least one photodetector network mainly extends.

According to an example, said at least one optical circuit comprises:
at least one lens defining said image focal plane optically coupled to the photodetector network, at least two reflective optics, comprising for example reflective surfaces, configured to reflect the beams emitted by the source to said at least one lens.

The present invention has a preferable field of application in detecting particles of various sizes, preferably in the field of microscopic, even nanometric particles. For example, the present invention can be used for detecting particles coming from smoke, explosive powder, polluting particles, dust particles, allergen particles such as pollens, mould spores, or also carcinogenic particles, or biological particles such as bacteria, viruses, or also exosomes.

The present invention applies to any type of particles conveyed by a fluid, whether this is liquid and/or gaseous.

The fluid present or flowing in the channel is for example, air. Such is the case for detectors integrated in the following systems: a fire alarm system, a fire detection system, a system for detecting explosive powder, a system for analysing the quality of a fluid such as air, and a pollution alarm system.

Alternatively, the fluid can be a liquid such as water. Such is the case for detectors integrated in systems for detecting microbiological species.

A simplified detector example according to the invention will now be described in reference to FIGS. 1 and 2, to understand the functioning principle of it.

The detector comprises a channel 20 intended to receive at least one fluid comprising particles 60. In FIG. 1, the channel 20 extends along a direction parallel to the axis x of the orthogonal marker xyz.

The detector also comprises an optical inlet making it possible for a light source 210 to emit light beams into the channel 20. The light cluster, coming from the source 210, is preferably collimated when it enters inside the channel 20. To this end, conventional optics can be provided. Inside the channel 20, the cluster has a main propagation direction 105 parallel to the axis y.

The light beams of this cluster, when they reach a particle 60, are deviated with respect to this main propagation direction 105.

The detector comprises optical systems 15a-15e arranged so as to collect the light beams scattered by the particles 60. Each optical system 15a-15e has an image focal plane and makes this image focal plane converge into one same point, all the light beams scattered by the particles along parallel directions.

Moreover, a photodetector 231 network 230a-230e is associated with each optical system 15a-15e. Each photodetector 231 can comprise or can be formed by a photodiode. Each photodetector 231 network can, or not, form a photodetector matrix. Alternatively, the photodetectors 231 of the network can be distributed along isovalue curves of the diffraction angles as will be explained in detail below.

The photodetector 231 networks 230a-230e and the optical systems 15a-15e are coupled such that the light beams scattered by the particles along parallel directions all reach one same point of a photodetector 231 network 230a-230e. In this manner, the invention makes it possible to reduce, even remove, the angular blurriness, which is usually induced when particles positioned randomly, project from the scatter diagrams translated according to the relative positions thereof, and when the distance which separates these particles is of the same magnitude as the distance separating the photodetectors of a network.

On the contrary, the invention provides that all the parallel beams fall onto one single and same point of the imager. Thus, the image obtained is an angular image of the scattering of a particle cloud. This image is independent of the individual position of each particle. The image obtained is thus a spatial Fourier transform of the particle cloud beam. Consequently, the invention thus makes it possible to considerably increase the sensitivity of the detector and contrasts it from the information supported by the particle beam diagram.

Figure 2:
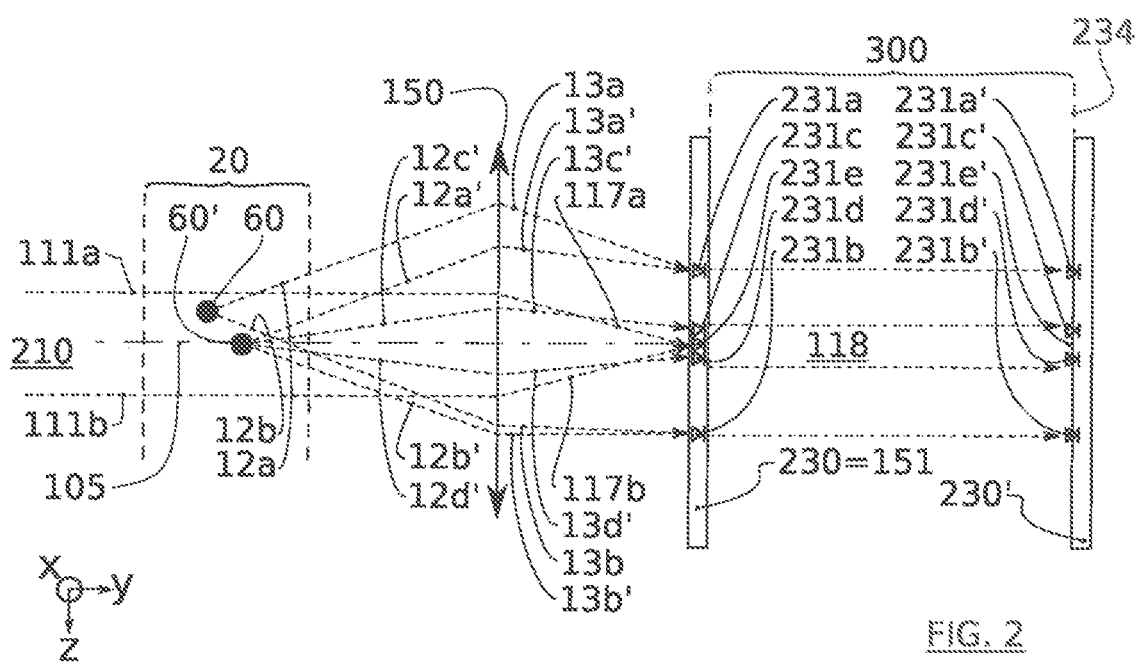
FIG. 2 illustrates, very schematically and in an enlarged manner, a portion of FIG. 1. This FIG. 2 clearly illustrates the advantages that the invention offers in terms of reducing the angular blurriness and reducing the blinding zone.

FIG. 2 is a partial and enlarged view of the zone in a dotted line referenced "A" in FIG. 1. In this FIG. 2, the light beams 12a and 12a' are scattered by the particles 60 and 60' along parallel directions. It is the same for the pairs of light beams 12b, 12b' and 12c, 12c'.

In this figure, the optical system comprises a convergent lens 150 which makes the light beams converge towards the image focal plane 151 thereof.

According to a first embodiment illustrated in this FIG. 2, the image focal plane 151 coincides with the imager formed by the photodetector 231 network 230. Thus, the refracted beams 13a, 13a' corresponding to the scattered parallel beams 12a, 12a' reach one same point of the image focal plane 151, ideally on one same photodetector 231a of the network 230. It is the same for the refracted beams 13b, 13b' corresponding to the scattered parallel beams 12b, 12b'.

According to an alternative embodiment, but also illustrated in this FIG. 2, the image focal plane 151 does not coincide spatially with the imager formed by the photodetector 231a'-231d' network 230'. In this alternative embodiment, the image focal plane 151 remains as shown in FIG. 2, but the photodetector 231 network 230 does not exist. Instead of the photodetector 231 network 230, the photodetectors 231a'-231d' are contained in a plane 234 which is located at a distance from the image focal plane 151 of the lens 150. In this case, an intermediate element 300 is provided, configured such that each point of the image focal plane 151 corresponds, bijectively, to a point of the network 230'. Thus, in this embodiment also, the invention makes it possible to reduce, even remove, the out-of-focus positioning.

This intermediate element 300 can be configured to not deviate the beams reaching the image focal plane 151, as illustrated in this FIG. 2. According to another embodiment, the intermediate element 300 is a converging optic, which can be advantageous to reduce the size occupied by the photodetector network with respect to the size of the optical system. Moreover, in the case of semiconductor photodiodes, this also makes it possible to reduce the dark noise. Indeed, the dark current is proportional to the surface of the photodiode.

According to another embodiment, the intermediate element 300 is a diverging optic, which can be advantageous to enlarge the angular scatter diagram at the level of the network and therefore analyse with even more precision, the scattering of the particles.

By reducing or by removing the out-of-focus positioning, the invention makes it possible to provide a broad, cross-sectional channel 20, the cross-section being taken in the plane yz. This makes it possible to have a fluid flow increased by natural convection. The invention therefore makes it possible to improve the response time of the same detector in the absence of any pump. This advantage is particularly significant in alarm systems, for example, in fire alarm systems.

This FIG. 2 also clearly shows that the optical system makes it possible to make the cluster passing through the channel 20 converge into a zone of limited size, even into a specific zone of the image focal plane 151 and therefore of the network 230, 230'. Indeed, the rays which pass through the channel 20 by being parallel 111a, 111b and which are not scattered reach a reduced zone, even one same point of the network 230. The blinding zone 118 is therefore very limited. Ideally, it is limited to a zone corresponding to a photodetector 231e. This zone corresponds to the image focus (also called main image focus). Outside of this zone, the photodetectors are not dazzling and can therefore provide information necessary for detecting and analysing particles. Such is, for example, the case for the photodetectors 231c, 231c' and 231d, 231d' which are in the immediate vicinity of the blinding zone 118. Thus, the invention makes it possible to detect the very low scattering angles, which makes it possible to enrich the scatter diagram and to improve the precision of detection and analysis.

As illustrated in FIG. 1, it is advantageously provided to have several optical systems 15a-15e around the channel 20. Preferably, a photodetector 231 network 230 is associated with each of the optical systems 15a-15e. Preferably, but in a non-limiting manner, the optical systems fully surround the channel 20. Preferably, they form a continuous perimeter around the channel. Thus, the detector can recover the beams scattered in all the directions of the plane yz. The complete particle scatter diagram can thus be obtained.

It will be noted, that according to an alternative embodiment, the optical systems do not fully surround the channel 20 and/or are not arranged continuously around the channel 20.

Also advantageously, the optical systems 15a-15e are arranged around the channel non-symmetrically with respect to the main propagation direction 105 of the light beam in the channel 20.

As indicated above, the ends of the lenses induce aberrations and the angular zones Z1', Z2 at the line between two lenses induce risks of incorrection. By considering that the particles 60 have no preferable orientation and that they are considered as statistically spherical, the scattering figure on these particles 60 has an axis of symmetry which coincides with the main propagation direction 105 of the light beam in the channel 20. In theory, a scatter diagram over 180° is complete, since it is symmetrical with respect to the main propagation direction 105. By providing an asymmetric assembly of optical systems 15a-15e with respect to this main propagation direction 105, the angular zones Z1', Z2 not or incorrectly imaged can be found, which are in the vicinity of line of two lenses, as the scatter formation is also supported by the angular zones Z1 and Z2', respectively symmetrical with respect to this direction 105, these symmetrical angular zones Z1 and Z2' themselves not being found at the line between two lenses.

For example, in order to not consider the angular zones Z1', Z2 not or incorrectly imaged, one of the following solutions, even a combination of these solutions can be implemented:

not providing photodetectors to collect beams coming from these zones. In this case, the beams coming from these zones reach the substrate 201 without meeting photodetectors.

not providing any electrical connection for the photodetectors which are positioned so as to collect the beams coming from these zones. This embodiment has the advantage of simplifying the arrangement of the photodetectors on the optronic circuit, in particular when they form matrices, not considering certain photodetectors thus occurring during the electrical connection.

providing a cover between the image focal plane and the photodetectors in order to block or absorb the beams coming from these zones. The cover is configured to absorb some and preferably all of the light beam which itself is incident.

providing a signal processing step in order to remove the information coming from the photodetectors having received the beams coming from these zones.

Figure 9:
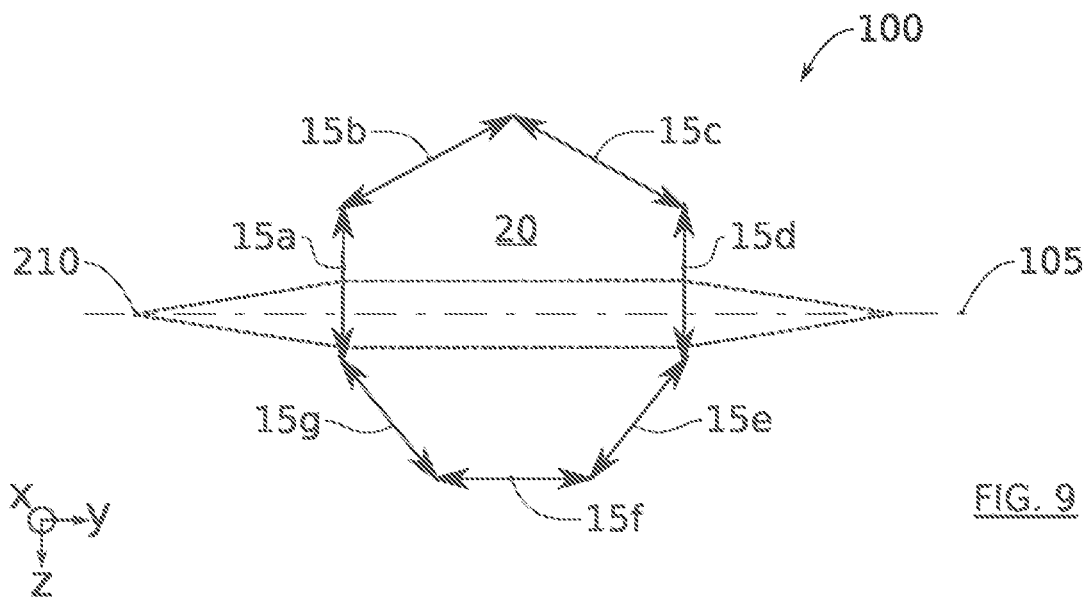
FIG. 9 is a diagram illustrating an embodiment alternative to that of FIG. 1. In this FIG. 9, the asymmetric structure of the optical systems comprises seven optical systems distributed around the channel.
Figure 10:
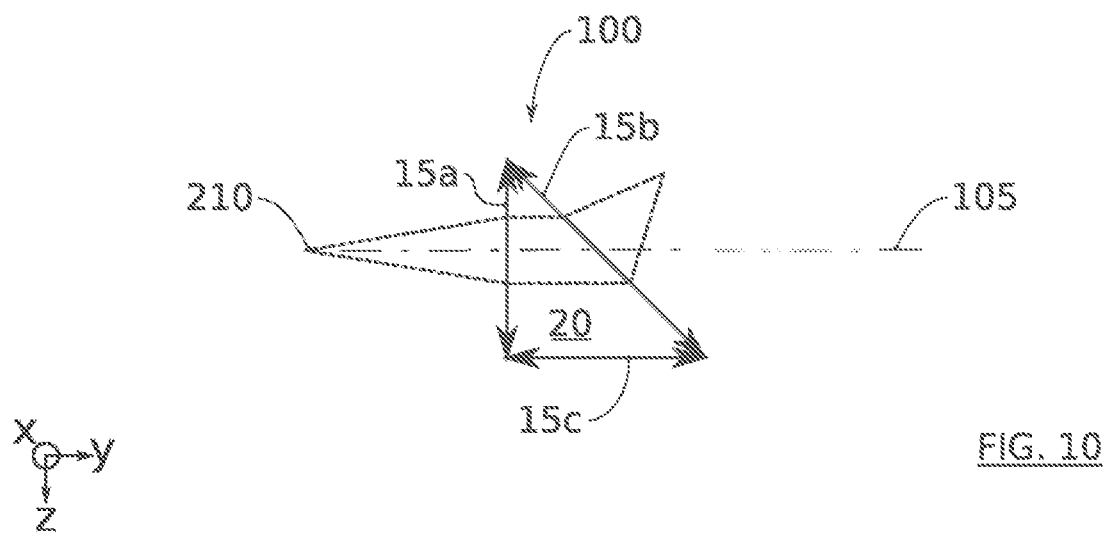
FIG. 10 is a diagram illustrating an embodiment alternative to that of FIG. 1. In this FIG. 10, the asymmetric structure of the optical structures comprises three optical systems distributed around the channel. For conciseness, in these FIGS. 9 and 10, the photodetector networks are not represented.

Preferably, an odd number of optical systems is used. In the example illustrated in FIG. 1, five optical systems are used. In the embodiments illustrated in FIGS. 9 and 10, the detector comprises respectively seven and three optical systems to fully surround the channel 20. In other embodiments, a higher number of optical systems can be provided. As indicated above, the configuration and the relative arrangement of these optical systems are asymmetric with respect to the main propagation axis 105 of the light beams.

Thus, the schematic illustrations of FIGS. 1 and 2 make it possible to clearly understand the advantages of the invention in terms of reducing the out-of-focus positioning, of reducing the blinding zone and of increasing the extent of the angular beam diagram detected. All these effects tend to improve the amount and the precision of the information obtained over the scattering of the particles. They also make it possible to improve the sensitivity and the response time of the detector.

The invention thus makes it possible to significantly improve detecting and analysing the nature of the particles.

A specific detector example according to the invention will now be described in reference to FIGS. 3 and 4. This specific example makes it possible to provide a very complete particle scatter diagram. It thus makes it possible to considerably improve the precision of the information collected about the particles. Moreover, this embodiment makes it possible to significantly reduce the volume of the detector. In particular, the surface thereof, taken perpendicularly to the main extension direction of the channel, and the thickness thereof, taken parallel to the main extension of the channel can be very limited.

The detector comprises an optical circuit 100 and an optronic circuit 200, of which the assembly defines the channel 20.

The optical circuit 100 comprises several optical systems 15a-15e arranged around the passage forming one portion of the channel 20. Each optical system comprises several spherical, aspherical, or also freeform dioptres 150a-150d, segmented between air and a transparent dielectric material. This transparent dielectric material can, for example, be a polymer-based resin.

Figure 8A:
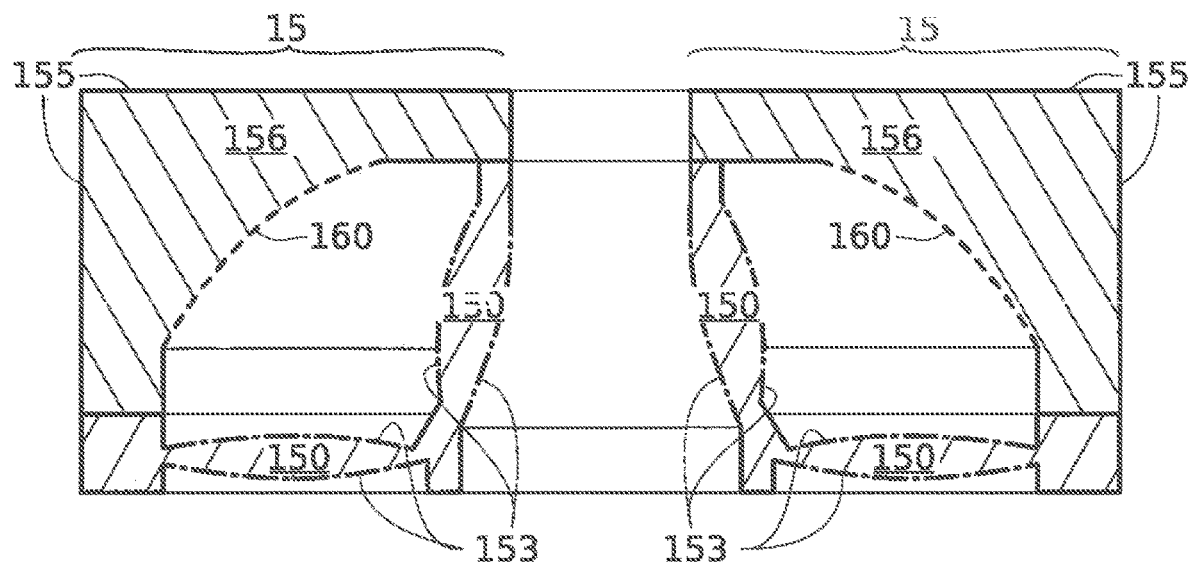
FIG. 8a illustrates, very schematically, the optical system equipping the optical circuit used in the embodiments represented in FIGS. 3, 5a to 5e and 7.
Figure 8B:
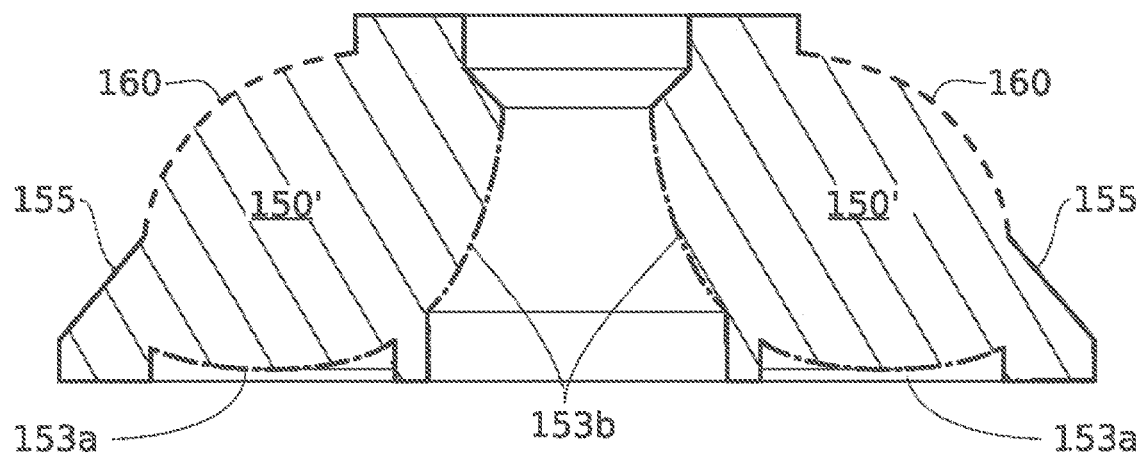

Each optical system also comprises reflective optics. These reflective optics comprise, or are for example formed of one or more reflective surfaces 160a-160b. In FIGS. 5b, 8a and 8b, these reflective surfaces 160 are illustrated by thick, dashed lines. These reflective optics are, for example, formed using a metal deposition, like for example, gold, aluminium or interferential dielectric mirrors.

These optics have the role of projecting the spatial Fourier transform of the beam coming from the particles 60 present in the channel 20 over an image focal plane 151 (yz) perpendicular to the main extension direction of the channel (direction x). These optics also have the role of collimating in the channel 20, the cluster emitted by the source 210, then of projecting this cluster over a spatially reduced zone at the level of the image focal plane, in order to reduce the blinding as indicated above.

Figure 3:
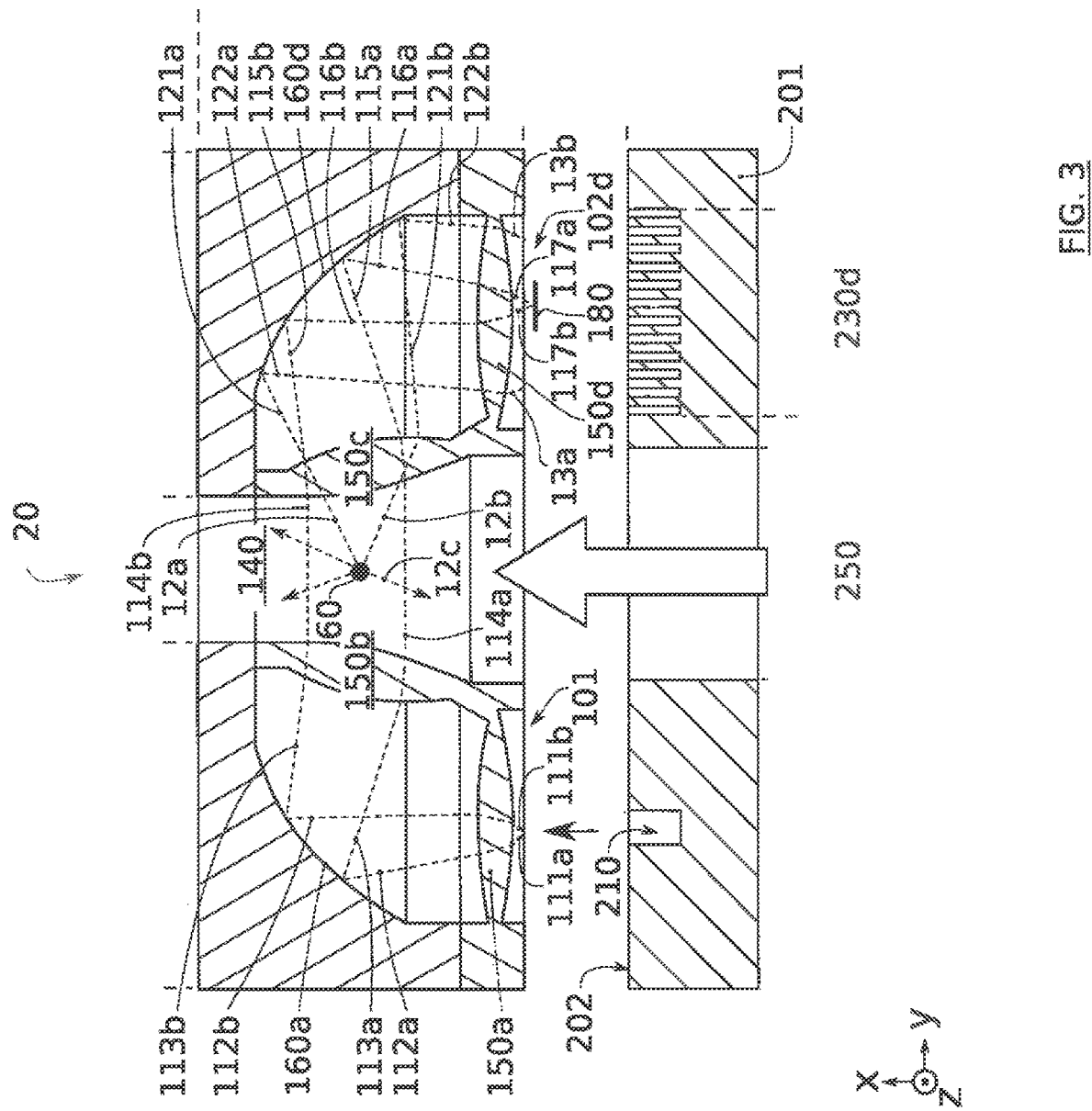
FIG. 3 is a cross-sectional view in the plane (x, y) of a non-limiting particle detector example according to the invention.

Preferably, the focal planes of the optical systems 15a-15e of the optical circuit 100 are coplanar (parallel to the plane yz in the example of FIG. 3).

The optronic circuit 200 is a circuit produced on a substrate 201, preferably semi-conductive, for example monocrystalline silicon. This optronic circuit 200 supports a photodetector 231 network 230 associated with each optical system. Thus, in FIG. 3, the network 230d is associated with the optical system 15d.

Preferably, the photodetectors 231 of the network 231 follow the curves 232 of the isovalues of the scattering angles, i.e. the projection by the lenses of coaxial cones centred on the direction 105. These curves 232 of the isovalues of the scattering angles thus form arcs or ring portions.

Alternatively, the photodetectors 231 of each network 230 form a photodetector 231 matrix. It can also be provided that one same matrix forms all of the networks 230.

As indicated above, each optical system 15 is optically coupled with the photodetector 231 network 230 which itself is associated such that there is a bijective optical correspondence between each point of the image focal plane 151 of the outlet 102 of the optical system 15 and each point of this network 230.

It can, for example, be provided that the plane 234 containing the photodetectors of the network 230d is combined with the image focal plane 151d of the optical system 15d. In this case, the contact plane between the optical circuit 100 and the optronic circuit 200 coincides with the image focal plane 151 of the optical systems 15 and the plane 234 containing the photodetectors of the network 230.

Alternatively, an intermediate element 300 can be provided, which imposes a distance between the image focal planes 151 of the optical systems and the photodetector 231 networks 230. This distance d is referenced in FIG. 3.

Preferably, the photodiode networks are aligned facing the optical systems. According to alternative embodiments, the intermediate element 300 makes it possible to ensure the optical coupling between the optical systems 15a to 15d and the photodetector 231 networks 230 to ensure a bijective correspondence without actually the optical systems being aligned with the photodetector networks. This embodiment is not illustrated in the figures.

As illustrated in the example of FIG. 3, the optronic circuit 200 also comprises the source 210.

The source is, for example, a surface-emitting light source, for example a surface-emitting LED or a VCSEL (vertical-cavity surface-emitting laser). This circuit optionally contains an electronic processing system. This circuit 200 additionally contains a through opening 250, which, when it is associated with the passage 140 of the optical circuit 100 defines at least partially the channel 20.

Preferably, the substrate 201 has a front face 202, which supports, or at least by which are accessible, the source 210 and the photodetector 231 networks 230.

As illustrated in this example, the optical circuit 100 extends between two parallel planes P1, P2. The optronic circuit 200 extends between two parallel planes P3, P4. P1, P2, P3 and P4 are parallel when the optical circuit 100 and the optronic circuit 200 are superimposed. The planes P1, P2, P3 and P4 are parallel to the plane YZ of the marker xyz illustrated in FIG. 3.

The interface formed between the optical circuit 100 and the optronic circuit 200 is a plane parallel to P1, P2, P3 and P4. If the optical circuit and the optronic circuit are in contact with this interface corresponds to P2 and P3.

Figure 4A:
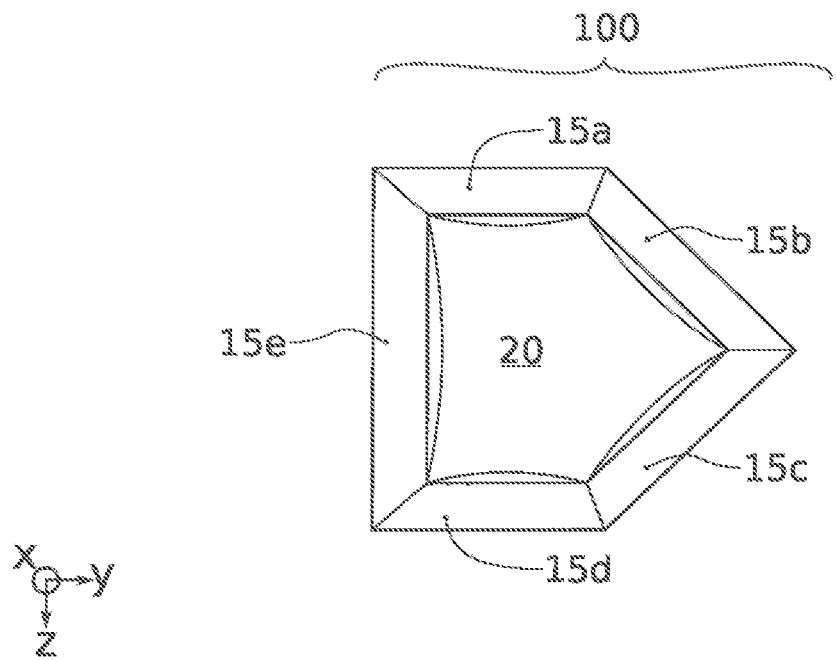
FIGS. 4a and 4b illustrate very schematically, top views of the optical circuit and the optronic circuit of the detector according to the example illustrated in FIG. 3.

FIG. 4a illustrates, as a top view, the arrangement in the plane yz, of five optical systems 15a-15e which fully surround the channel 20.

Figure 4B:
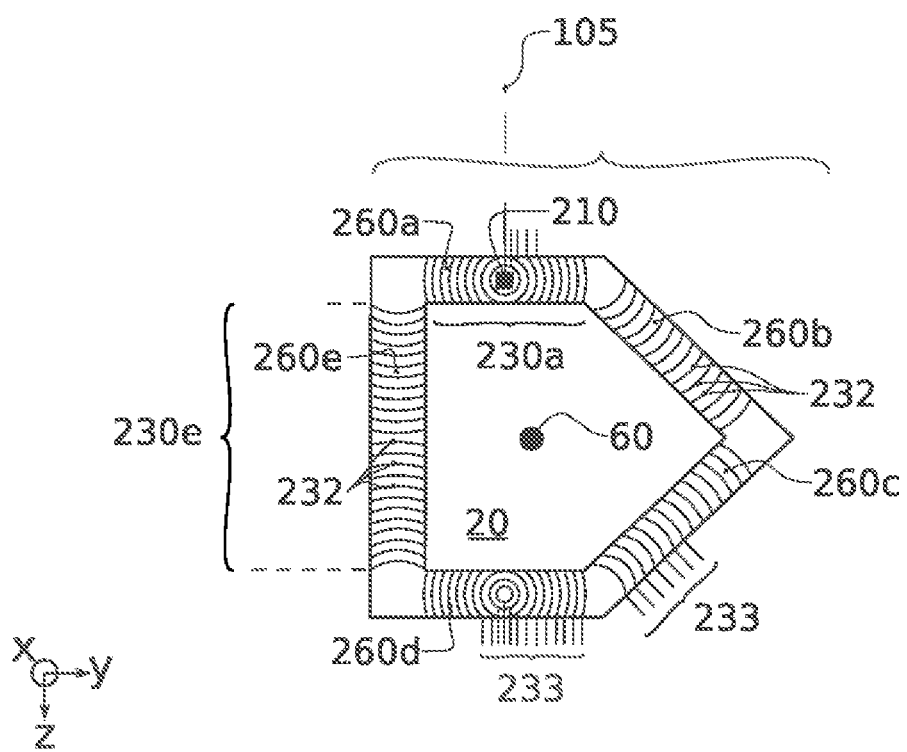

FIG. 4b illustrates, as a top view, the arrangement in the plane yz, of five networks 230a-230e of photodetectors which fully surround the channel 20.

The source 210 is arranged such that the cluster passing through the channel 20 defines a main propagation direction 105. The optical systems 15a-15e and the networks 230a-230e are arranged non-symmetrically with respect to this direction 105. As has been explained above, this makes it possible to obtain a correct image of the scatter diagram from 0° to 180°.

The optronic system 200 is thus formed of segments 260a-260e which, preferably, surround the channel 20 and preferably forms a continuous perimeter.

The segment referenced 260a supports the source 210. It makes it possible to collect the beam scattered towards the back (backscattering).

The segment referenced 260b makes it possible to collect the beam scattered towards the back and the side (back-side scattering).

The segment referenced 260c makes it possible to collect the beam scattered towards the front and the side (forward-side scattering).

The segment referenced 260d makes it possible to collect the beam scattered towards the front (forward scattering).

The segment referenced 260e makes it possible to collect the beam scattered towards the side (side scattering).

Thus, the assembly formed of optical systems 15a-15e collects all the beams scattered by the particles 60. All of the beam diagram can thus be determined.

FIG. 4b also makes the electrical outlets 233 of the detectors appear. If the electronic processing system is delayed, thus there are as many electrical outlets as photodiodes. If the electronic processing system is integrated, thus there are only electrical outlets of the circuit after processing.

In reference to FIG. 3, an optical circuit example 100 will not be described in detail. This optical circuit 100 is, in particular, configured to:

collimate, at least in the channel 20, the cluster coming from the source 210, this collimated cluster having a direction (y) parallel to the plane 234 (yz) wherein the photodetector 231 networks 230a-230d extend and perpendicular to the main extension direction (x) of the channel 20, and bring the beams scattered by the particles 60 onto the plane 234 (yz), such that these beams are collected by the photodetectors 231.

For this, the optical circuit 100 has an inlet 101 by which the beams 111a, 111b emitted by the source 210 enter. In this example, the beams referenced 111a, 111b illustrated the edge of the cluster emitted by the source. Preferably, this inlet 101 is arranged to the right of the source 210. A first lens 150a forming two dioptres is arranged to the right of the inlet 101 so as to be passed through the beams 111a, 111b. The beams refracted 112a, 112b by this lens 150a are reflected by a first reflective surface 160a. The beams reflected 113a, 113b by this reflective surface 160a passing through a second lens 150b which preferably forms a portion of the wall of the channel 20. This lens 150b preferably makes it possible to collimate the cluster 114a, 114b passing through the channel 20. Some of the beams of this cluster are deviated by the particles 60. These scattered beams are referenced 12a, 12b, 12c. Some of these scattered beams 12a, 12b pass through a lens 150c of a second optical system 15d. The scattered beams 121a, 121b having passed through the lens 150c are reflected by a reflective surface 160d of this second optical system 15*d*. This reflective surface 160*d* reflects 122*a*, 122*b* these beams scattered in the direction of a lens 150*d* of this second optical system 15*d*.

The lens 150*d* is configured to orient the beams 122*a*, 122*b* over the photodetector 231 network 230*d*. The beams exiting the lens 150*d* are referenced 117*a*, 117*b* in FIG. 3. They escape from the optical system through the optical outlet 102*d*.

The optical system 150*d* is configured such that all the beams scattered by the particles along parallel directions in the channel 20 reach the image focal plane 151*d* of this optical system 150*d* at one same point and reach one same point of the photodiode 231 network 230*d*. However, as above, the beams scattered by the particles along non-parallel directions in the channel 20 reach the image focal plane 151*d* of this optical system 150*d* in separate points and thus also reach separate points of the photodiode 231 network 230*d*.

According to the same principle, all the parallel beams forming the collimated cluster passing through the channel 20 (the cluster being schematically delimited by the two beams 114*a*, 114*b*), and which are not scattered by the particles 60, reach one same point of the image focal plane 151*d* and therefore one same point of the imager. They therefore only dazzle one reduced zone of the imager, ideally one single photodetector. The path of the beams of the collimated cluster which are not scattered by the particles 60 is illustrated by the references 115*a*, 115*b*, 116*a*, 116*b*, 117*a*, 117*b*.

Thus, the optical systems 15*a*, 15*d* are convergent so as to make the light beams not scattered 111*a*, 111*b* by the particles 60 and the light beams scattered 12*a*-13*a*, 12*b*-13*b* by the particles 60 converge, towards at least one image focus located on the image focal plane 151*d* of the optical system 15*d*. More specifically, the optical system 15*d* is convergent, such that the light beams coming from the source 210 and which have not been deviated by the particles 60 converge towards an image focus, which can be called main image focus, and located on the image focal plane 151*d*;

and such that the beams scattered 12*a*-13*a*, 12*b*-13*b* by the particles 60 themselves converge towards other image focuses, called secondary image focuses, which are also located on the image focal plane 151*d*.

In the example illustrated in FIG. 3, each of the lenses 150*a*-150*d* is constituted of one or more spherical or aspherical dioptres. According to other examples not illustrated, each lens can be constituted of segmented dioptres.

According to an advantageous, but non-limiting embodiment, as is illustrated in FIG. 8*a*, the optical elements 150 can be fully or partially covered by an anti-reflection layer 153. The reflective surfaces 160 are, for example, obtained by metallisation. Some or all of the other surfaces of the optical system 15 can be covered by an absorbent surface 155 formed, for example, of a dark film, for example black paint. In FIGS. 5*b*, 8*a* and 8*b*, these absorbent surfaces 155 are illustrated by thick solid lines.

In these examples, the optical systems 15 each comprise two optical elements. Each optical element comprises two dioptres. Preferably, each optical element is a spherical or aspherical lens 150 in this example. The optical system 15 comprises a support 156. The support 156 supports the reflective optics such as the reflective surface 160. The support 156 also supports the two lenses 150, 150. These two lenses 150, 150 are preferably returned onto the support 156. The embodiment of this type of optical system will be described in detail in reference to FIGS. 5 to 7. All of this optical system has five dioptres. Within this optical system, the light beams are propagated through lenses and into the air.

According to another embodiment example, illustrated in FIG. 8*b*, the optical system 15' comprises one single optical part 150'. This optical part 150' has three dioptres. A first dioptre 153*a* is configured to orient the incident beams on a second dioptre forming a reflective optic (reflective surface 160). This second dioptre 160 is configured to reflect the beams in the direction of a third dioptre 153*b*.

The first 153*a* and third dioptre 153*b* are, for example, covered by an anti-reflective coating. In FIGS. 5*d*, 8*a* and 8*b*, these anti-reflective coatings are illustrated by an alternance of a short and a long solid line. The other surfaces are preferably covered with an absorbent surface 155 formed, for example, a dark film.

In this embodiment, the optical part 150' is monolithic. It is preferably formed of one single holding. It has no opening. Within this optical system, the light beams do not propagate into the air, but only into the material, for example a polymer-based resin. This makes it possible to improve the robustness of the optical system. Moreover, this makes it possible to reduce the errors in producing and aligning different optical elements forming one same optical system. This embodiment thus makes it possible to simplify the method, in reducing the cost, while improving the precision of the measurements.

Figure 6A:
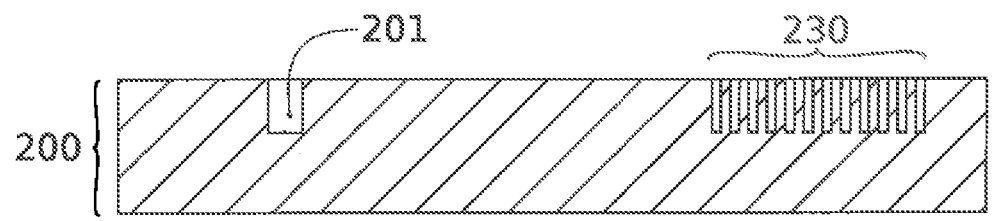
FIGS. 6a and 6b illustrate steps of an example of a method for forming the optronic circuit equipping the detector according to the embodiment illustrated in FIG. 3.
Figure 6B:
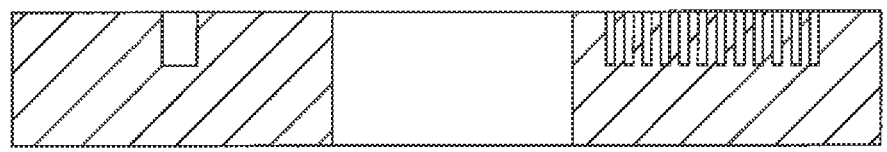
Figure 7:
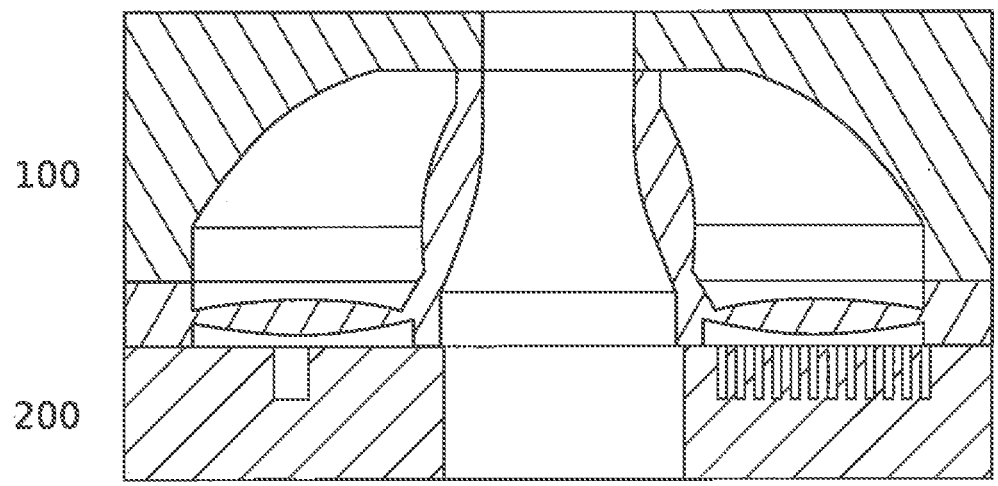
FIG. 7 illustrates the step of assembling the optical circuit and the optronic circuit obtained from the steps represented in FIGS. 5e and 6b.

FIGS. 5 to 7 illustrate an embodiment method example of the detector according to FIG. 3.

FIGS. 5*a* to 5*e* illustrate the embodiment of the optical circuit 100.

The optical circuit 100 can be made of two portions 157, 170 by embossing or by injection moulding a transparent dielectric material, for example a polymer-based resin.

A first part 157 defines the supports 156 for the lenses 150. This first part 157 also acts as a support for the reflective surfaces 160.

Figure 5A:
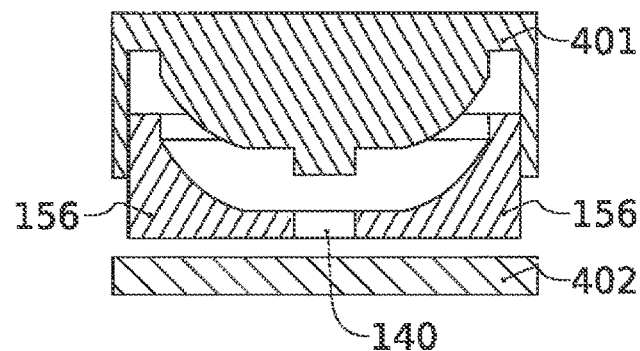
FIGS. 5a to 5e illustrate steps of an example of a method for forming the optical circuit equipping the detector according to the embodiment illustrated in FIG. 3.
Figure 5B:
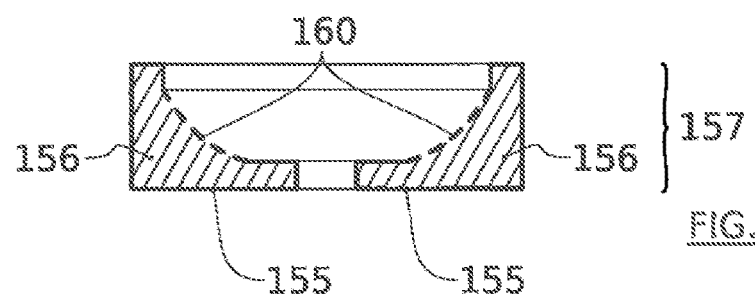
Figure 5C:
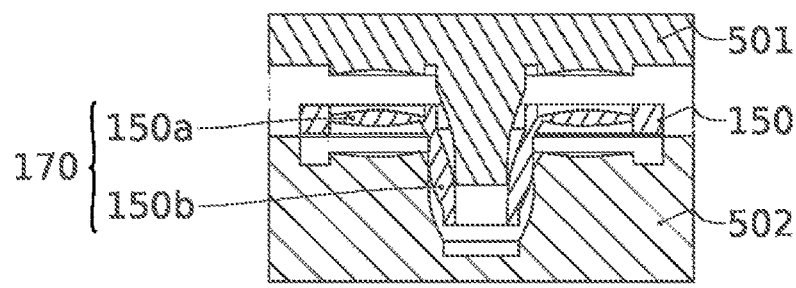
Figure 5D:
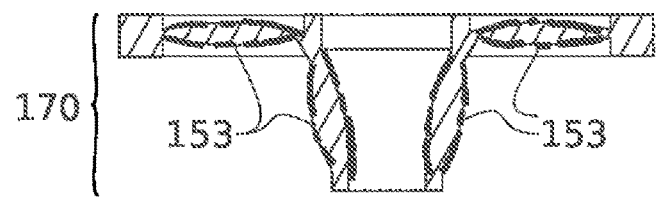
Figure 5E:
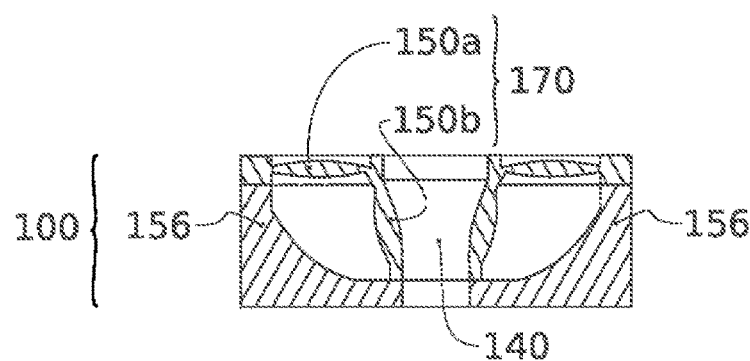

This first part 157 is for example, obtained by moulding from a mould formed of the portions 401 and 402 illustrated in FIG. 5*a*.

A second part 170 supports the assembly of the lenses 150. This part 170 is, for example, obtained by moulding from a mould formed of the parts 501 and 502 illustrated in FIG. 5*c*.

Once each of the parts 157, 170 are moulded, the materials thereof are hardened, for example with a thermal annealing step, then it is demoulded. Thus, the parts 157, 170 are obtained, of which the shapes are illustrated in FIGS. 5*b* and 5*d*. If necessary, the lenses 150 intended to form a portion of the channel are inclined in order to have a clearance angle making it possible to facilitate the demoulding step. This inclination can be compensated by the other optical elements of the optical circuit 100.

Preferably, each of the moulded parts is of a size of a wafer, i.e. a semi-conductive material trench obtained by conventional microelectronic methods, typically a disc of 200 or 300 mm.

Once the parts are hardened, then a polishing of the surfaces is proceeded with. It is necessary to have surfaces of optical quality, i.e. with a low roughness. In order to form the reflective surfaces 160, certain walls of the supports 156 are metallised (with, for example, gold or aluminium). It is also possible to deposit anti-reflective layers 153 on the dioptres of the lenses 150 and deposit an anti-reflection layer 155, for example, of the black absorbent paint, on the surfaces other than the mirrors and the dioptres of the lenses.

These different layers are illustrated in FIGS. 5b and 5d.

The two parts 157 and 170 are then assembled. In the example illustrated, this assembly is made wafer against wafer, for example with adhesive or with a plasma surface treatment. This step is schematised in FIG. 5e.

FIGS. 6a and 6b illustrate an embodiment method example of the optronic circuit 200 of FIG. 3.

From a semi-conductive substrate 201, for example monocrystalline silicon, the photodetectors are produced, for example, photodiodes. Preferably, also from this substrate 201, the light source 210 is produced. This light source 210 is preferably a surface-emitting source.

Preferably, the photodetectors, the source 210, even also, the processing electronics, are produced according to conventional microelectronic and optoelectronic techniques. This step is schematised in 6a.

Then, a deep etching is carried out through the whole substrate 201 to structure the opening 250 which will partially define the fluidic channel 20. This opening 250 is a through opening. This step is schematised in FIG. 6b.

Finally, as illustrated in FIG. 7, the optical circuit 100 is hybridised with the optronic circuit 200 by aligning the optics facing photodiodes. The assembly, preferably wafer-to-wafer can be achieved with optical adhesive or with a plasma surface treatment.

In view of the description above, it clearly appears that the invention proposes an effective solution to improve the sensitivity and the precision of the detector as well as the response time thereof.

The invention is not limited to the embodiments described, but extends to any embodiment entering into the scope of claim 1.

In particular, any one of the variants proposed below can be provided which can be implemented in combination with any of the embodiments described above.

A first variant consists of in that instead of producing optical systems with one same material, it can be provided to use a second material, preferably dielectric, to produce achromatic refractive optics. This makes it possible, for example, to relocalise in one same point, light beams having different wavelengths.

It can also be provided, that the optical circuit 100 receives light clusters of a different wavelength. For example, it can be provided that the optical system 100 is optically coupled with several optical sources, these optical sources emitting different wavelengths. This makes it possible, in particular, to analyse the nature thereof more specifically.

Another advantageous variant consists of implementing a control of the polarisation, at the level of the source or by way of a polarising optic. This makes it possible to obtain two scatter diagrams which makes it possible in the end to improve the analysis.

Another variant consists of recycling light using a mirror cavity to make it possible for light from the source to make several passages through the channel and thus improve the sensitivity of the sensor. These mirrors are preferably placed between the source and the image of the source by the optical system. Thus, these mirrors would be arranged above the dazzling zone. Naturally, these mirrors would not be arranged above photodetectors which are not located in the dazzling zone. An example of positioning this mirror is illustrated in FIG. 3 by the reference 180.

REFERENCES

100. Optical circuit
101. Optical inlet
102. Optical outlet
105. Main propagation direction of the light beam in the channel
111. Beams emitted by the source
112, 113, 114. Refracted and/or reflected beams
118. Blinding zone
12. Light beams scattered by the particle
121, 122 Beams refracted by a lens after scattering by a particle
13. Light beams exiting the optical system
140. Passage
15. Optical system
150. Lens
151. Image focal plane
152. Optical axis
153. Anti-reflective surface
155. Absorbent surface
156. Support
157. Support part
160. Reflective surface
170. Optical part
180. Mirror
20. Channel
60. Particle(s)
200. Optronic circuit
201. Substrate
202. Front face
210. Source
211. Main emission direction
230. Photodetector network
231. Photodetectors
232. Isovalue curves
233. Electrical outlets of the photodetectors
234. Plane containing the photodetectors
250. Opening
260. Segments
300. Intermediate element
401, 402. Mould part
501, 502. Mould part

The invention claimed is:

1. A particle detector comprising:
a channel configured to receive at least one fluid comprising particles and configured to receive at least one light beam emitted by a light source;
at least one planar photodetector network configured such that at least some photodetectors of the at least one planar photodetector network receive light beams emitted by the light source and scattered by the particles present in the channel;
wherein:
the detector further comprises at least one optical system configured to be passed through by one portion of the light beams after the scattering thereof by the particles and before the light beams are received by the photodetectors,
each optical system is associated with a planar photodetector network and has one single image focal plane,
the detector is configured such that said image focal plane of each optical system is optically coupled to all planar photodetectors of the planar photodetector network associated with the respective optical system,
all light beams scattered by the particles in directions parallel to a first direction before passing through the respective optical system, after passing through the respective optical system, are converged at a first point of the planar photodetector network associated with the respective optical system and all light beams scattered by the particles in directions parallel to a second direction before passing through the respective optical system after passing through the respective optical system, are converged at a second point of the planar photodetector network associated with the respective optical system, the second point being different from the first point, each optical system comprises a first lens arranged to receive the one portion of the light beams, a mirror arranged to reflect light beams passing through the first lens, and a second lens arranged to receive light beams reflected from the mirror and converge the light beams reflected from the mirror onto the planar photodetector network, and the at least one optical system is convergent so as to make all light beams coming from the light source and not scattered by the particles converge at the image focal plane of the optical system and reach one or more photodetectors of the photodetector network associated with the respective optical system.

2. The detector according to claim 1, wherein the image focal plane of each optical system is in a same position as the photodetectors of the planar photodetector network associated with the respective optical system.

3. The detector according to claim 1, wherein the image focal plane of each optical system is located at a distance from the photodetectors of the planar photodetector network associated with the respective optical system.

4. The detector according to claim 1, configured such that said image focal plane of each optical system is optically coupled to the planar photodetector network associated with the respective optical system such that all light beams scattered by the particles along non-parallel directions before passing through the respective optical system, after passing through the respective optical system, are converged at separate points of the planar photodetector network associated with the respective optical system.

5. The detector according to claim 1, configured such that said image focal plane of each optical system is optically coupled to the planar photodetector network such that all light beams scattered by a particle along non-parallel directions and according to a same scattering angle before passing through the respective optical system reach, after passing through the respective optical system, separate points of the planar photodetector network associated with the respective optical system, the separate points being located on a circle.

6. The detector according to claim 1, comprising a plurality of optical systems, the plurality of optical systems being arranged so as to extend around one portion of the channel.

7. The detector according to claim 6, wherein the plurality of optical systems is arranged so as to extend around an entirety of the channel.

8. The detector according to claim 7, wherein the plurality of optical systems is arranged continuously around an entirety of the channel.

9. The detector according to claim 7, wherein the photodetectors of the respective planar photodetector networks associated with each optical system are arranged according to isovalue curves of scattering angles.

10. The detector according to claim 6, wherein a number N of optical systems is odd.

11. The detector according to claim 6, configured such that a scattering figure of the particles has an axis of symmetry which coincides with a main propagation direction of the at least one light beam being propagated in the channel, and wherein the optical systems of the plurality of optical systems are distributed non-symmetrically with respect to said main propagation direction.

12. A particle detector comprising:

a channel configured to receive at least one fluid comprising particles and configured to receive at least one light beam emitted by a light source;

at least one photodetector network configured such that at least some photodetectors of the at least one photodetector network receive light beams emitted by the light source and scattered by the particles present in the channel;

wherein:

the detector further comprises at least one optical system configured to be passed through by one portion of the light beams after the scattering thereof by the particles and before the light beams are received by the photodetectors, each optical system is associated with a photodetector network and has an image focal plane, the detector is configured such that said image focal plane of each optical system is optically coupled to the photodetector network associated with the respective optical system, such that all light beams scattered by the particles along a first set of parallel directions before passing through the respective optical system, after passing through the respective optical system, are converged at a same point of the photodetector network associated with the respective optical system, the at least one optical system is convergent so as to make all light beams coming from the light source and not scattered by the particles converge at the image focal plane of the optical system, the particle detector further comprising a plurality of optical systems, the plurality of optical systems being arranged so as to extend around one portion of the channel, an optical circuit forming a one-piece assembly, the optical circuit comprising the plurality of optical systems and furthermore having a passage partially forming at least the channel, and an optronic circuit comprising a substrate supporting at least one from among the photodetector network and said light source, the optronic circuit having an opening facing the passage, the optical circuit and the optronic circuit being superimposed.

13. The detector according to claim 6, wherein the photodetector networks associated with the optical systems extend in a same plane and wherein the optical systems comprise reflective optics configured to reflect the light beams scattered by the particles in a direction of said plane.

14. The detector according to claim 1, further comprising said light source configured to emit said at least one light beam and a substrate, and wherein the at least one planar photodetector network and the light source are supported by the substrate.

15. The detector according to claim 1, wherein the channel extends along a main extension direction, wherein the at least one planar photodetector network extends mainly into a plane perpendicular to said main extension direction of the channel, and the detector comprising said light source, said light source emitting a light beam along a main emission direction parallel to said main extension direction of the channel and perpendicular to said plane.

16. The detector according to claim 15, wherein said at least one optical system comprises:
   at least one lens defining said image focal plane optically coupled to the planar photodetector network associated with the respective optical system, and
   at least two reflective optics, comprising reflective surfaces, and configured to reflect the light beams emitted by the light source to said at least one lens.

17. A system comprising the detector according to claim 1, wherein the system is taken from among:
   a fire alarm system,
   a fire detection system,
   a system for analysing quality of a fluid,
   a pollution alarm system,
   a system for detecting explosive powder, and
   a system for detecting microbiological species.

18. A method for producing the particle detector according to claim 1, the method comprising:
   providing at least one optical circuit comprising the at least one optical system,
   providing at least one optronic circuit comprising at least one substrate supporting the at least one planar photodetector network, and
   superimposing the at least one optical circuit and the at least one optronic circuit such that said image focal plane of each optical system is optically coupled to the planar photodetector network associated with the respective optical system such that light beams scattered by the particles along parallel directions before passing through the respective optical system, after passing through the respective optical system, are converged at a same point of the photodetector network associated with the respective optical system.

19. The detector according to claim 1, wherein the at least one optical system is convergent so as to make all light beams coming from the light source and not scattered by the particles converge at the image focal plane of the optical system at a third point different from each of the first and second points.

20. The detector according to claim 1, wherein the optical system comprises a unified structure having:
   a first reflective surface configured to receive light from the light source and reflect light used to form the at least one light beam received by the channel; and
   at least one second reflective surface configured to receive at least a portion of the light beams emitted by the light source and scattered by the particles present in the channel and reflect the light beams toward one of the photodetectors of the at least one planar photodetector network.

* * * * *